Patented Feb. 20, 1951

2,542,061

UNITED STATES PATENT OFFICE 2,542,061

POWDERED DDT CONCENTRATE

Charles M. Smith, Silver Spring, Md.; dedicated to the People of the United States of America No Drawing. Application June 9, 1945, Serial No. 598,485

6 Claims. (Cl. 167—42)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to insecticides, particularly those containing DDT, and has among its objects the provision of finely powdered and free-flowing insecticidal compositions containing insecticidally active quantities of DDT, and in particular, containing at least 50 percent, by weight, of DDT. Other objects will be apparent from the following description of the invention.

Commercial DDT, which contains about 75 percent, by weight, of 2,2-bis(p-chlorophenyl)-1,1,1-trichloroethane and about 25 percent, by weight, of an isomer thereof, namely, 2-(o-chlorophenyl)-2-(p-chlorophenyl)-1,1,1-trichloroethane, is a soft, waxy material having a setting point as low as about 88° C. (190° F.), and softens at temperatures considerably below that figure. It is difficult to produce it in powdered form because it softens under the heat of grinding and piles up upon the hammers, baffles, screens, and other interior parts of the grinding mill. After grinding, it has a tendency to agglomerate into lumps and hence will not persist very long in the finely powdered form necessary for application by dusting machines used for distributing insecticides.

Suitable dusting powders containing DDT in admixture with a diluent such as talc or pyrophyllite, can be made if the percentage of DDT in the mixture is kept low, and preparations containing up to about 10 percent, by weight, of DDT are in common use. However, when the percentage of DDT in the mixtures is raised up to about 50 percent, difficulty is encountered, and products containing this proportion are not readily obtainable.

I have found that a particular variety of silica gel, hereinafter designated as silica aerogel, which is commercially available, is an excellent conditioning agent for powdering DDT. This variety of silica gel is that which is made, in general, by treating water glass with an acid, such as hydrochloric acid, to form an aquagel. The aquagel is then washed with an organic liquid, such as 95 percent alcohol, until the formed chloride is completely removed and until the water contained in the aquagel has been replaced by the organic liquid. The resulting gel is then heated, under pressure exceeding the critical pressure of the liquid medium, to a temperature above the critical temperature of that medium before allowing the vapor to escape. This heat treatment accomplishes the drying of the gel without the formation of a liquid-vapor interface, thereby avoiding the shrinkage and consolidation of the gel particles which take place in the preparation of the ordinary variety of silica gel used, for example, for refrigeration and other adsorptive uses. There is thus produced a voluminous silica aerogel which, when pulverized, weighs only about from 6.5 to 9 pounds per cubic foot. Nine pounds per cubic foot is equivalent to about 0.14 gram per cubic centimeter.

It has been found that the aquagels, when produced at about pH 4.5, appear somewhat more suitable than those produced at about pH 5.8, and the more finely powdered grades of the silica aerogel, produced by "micronizing" in an air attrition mill, appeared superior to those "micropulverized" in a hammer mill. However, all forms are suitable and will form effective insecticidal compositions with high percentages of DDT.

When a simple mixture of the above-described silica aerogel with DDT is fed into a hammer mill, the tendency of the DDT to consolidate on the hammers and baffles and to clog the screen of the mill is greatly lessened, thus facilitating the production of mixtures containing much more than 50 percent DDT. Using the above procedure, we have prepared insecticidal compositions containing about from 90 percent to about 99 percent DDT, which compositions proved to have certain characteristics superior to the powdered DDT that can be produced in small lots in the same mill. These products are freer-flowing, pass more rapidly through fine sieves, and cake less upon standing at elevated temperatures (about 55° C.). In carrying out the procedure of the invention, it is necessary merely that the required proportions of DDT, crudely ground, and a variety of the powdered silica aerogel herein described be mixed, and that this mixture then be fed into a pulverizing mill at such a rate as to minimize any residual tendency to pile up on the internal part of the mill. The product so obtained is a free-flowing powder well adapted to use as such in insecticide-distributing machines, and it mixes readily with common diluents to produce compositions containing any lesser concentrations of DDT.

Having thus described my invention, I claim:

1. An insecticide comprising a powdered mixture of DDT and a silica aerogel, said DDT ranging in proportion from about 50 percent to about 99 percent, by weight, of the mixture, the aerogel having a bulk density of not more than about nine pounds per cubic foot.

2. A process of preparing an insecticide comprising milling a mixture of DDT and a silica aerogel to form a powder containing from about 50 percent to about 99 percent, by weight, of the DDT, the aerogel having a bulk density of not more than about nine pounds per cubic foot.

3. An insecticide comprising a powdered mixture of DDT and a silica aerogel, said DDT constituting about 90 percent, by weight, of the mixture, the aerogel having a bulk density of not more than about nine pounds per cubic foot.

4. An insecticidal composition of matter comprising a free-flowing, powdered mixture which comprises, on the basis of the weight of said composition, at least 90% 1,1,1-trichloro-2,2-bis-(p-chlorophenyl) ethane, and a silica aerogel, which, when pulverized weighs about from 6.5 to 9 pounds per cubic foot.

5. An insecticidal composition of matter comprising a free-flowing, powdered mixture which comprises, on the basis of the weight of said composition, at least 90% 1,1,1-trichloro-2,2-bis-(p-chlorophenyl) ethane, and a silica aerogel having a bulk density of about 0.14 and below.

6. An insecticidal composition of matter comprising a free-flowing, powdered mixture which comprises, on the basis of the weight of the composition, more than 50% DDT, and not more than about 10% finely divided silica aerogel, the aerogel having a bulk density of not more than about nine pounds per cubic foot.

CHARLES M. SMITH.

REFERENCES CITED

The following references are of record in the file of this patent:

UNITED STATES PATENTS

| Number | Name | Date |
| --- | --- | --- |
| 1,922,416 | Block | Aug. 15, 1933 |
| 2,014,609 | Barnhill | Sept. 17, 1935 |
| 2,207,737 | Hooft | July 16, 1940 |
| 2,218,031 | Reichert | Oct. 15, 1940 |
| 2,257,545 | Curtis | Sept. 30, 1941 |
| 2,349,814 | Deonier et al. | May 30, 1944 |

FOREIGN PATENTS

| Number | Country | Date |
| --- | --- | --- |
| 348,184 | Great Britain | May 8, 1931 |
| 547,874 | Great Britain | Sept. 5, 1942 |